United States Patent
Omran et al.

(12) 
(10) Patent No.: US 12,479,723 B1
(45) Date of Patent: Nov. 25, 2025

(54) MANUFACTURING A NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/070,165

(22) Filed: Mar. 4, 2025

(51) Int. Cl.
   *C01B 21/06* (2006.01)
   *C01F 7/162* (2022.01)
   *C01G 45/024* (2025.01)

(52) U.S. Cl.
   CPC .......... *C01B 21/0605* (2013.01); *C01F 7/162* (2013.01); *C01G 45/024* (2025.01); *C01P 2002/01* (2013.01); *C01P 2002/72* (2013.01); *C01P 2004/04* (2013.01); *C01P 2006/12* (2013.01); *C01P 2006/14* (2013.01); *C01P 2006/16* (2013.01); *C01P 2006/17* (2013.01)

(58) Field of Classification Search
   CPC .... C01B 21/0605; C01G 45/024; C01F 7/162
   See application file for complete search history.

(56) References Cited

FOREIGN PATENT DOCUMENTS

| | | |
|---|---|---|
| CN | 108786874 B | 5/2021 |
| CN | 113070084 B | 6/2022 |
| CN | 117654532 A | 3/2024 |
| IN | 202331026007 A | 10/2024 |

OTHER PUBLICATIONS

Parmeshwar Lal Meena, et al., "Synthesis of graphitic carbon nitride/zinc oxide (g-C3N4/ZnO) hybrid nanostructures and investigation of the effect of ZnO on the photodegradation activity of g-C3N4 against the brilliant cresyl blue (BCB) dye under visible light irradiation", Advanced Composites Hybrid Materials, vol. 6, No. 16, Dec. 19, 2022, pp. 1-17.

*Primary Examiner* — James A Fiorito
(74) *Attorney, Agent, or Firm* — Oblon, McClelland, Maier & Neustadt, L.L.P.

(57) ABSTRACT

A method of manufacturing a nanocomposite may include combining a magnesium salt, an aluminum salt, and a manganese salt in stoichiometric proportions within 5 mol. % in an aqueous solvent including menthol or dextrose, to obtain a first mixture. The method further may include heating the first mixture to remove at least 99.5 percent by weight (wt. %) of the aqueous solvent to obtain a first solid, grinding the first solid into a first powder, calcining the first powder at a temperature of about 600 to 800° C. for a time of about 2 to 4 hours to obtain a second solid, grinding the second solid and urea, into a second powder, heating the second powder at a temperature of about 550 to 650° C. for a time of about 15 minutes to 1.5 hours to obtain the nanocomposite.

20 Claims, 6 Drawing Sheets

MANUFACTURING A NANOCOMPOSITE

BACKGROUND

Technical Field

The present disclosure is directed towards nanocomposite synthesis, and more particularly, towards a method of manufacturing a nanocomposite including graphitic-$C_3N_4$, $MnO_2$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy storage devices, such as supercapacitors, require materials with high specific surface area, excellent electrical conductivity, and chemical stability to achieve optimal performance. Carbon nanomaterials have emerged as a promising class of materials for such applications due to desirable properties and versatility of the carbon nanomaterials. The aforementioned nanomaterials possess a highly specific surface area, which facilitates increased contact with electrolytes, thereby enhancing the active area essential for efficient charge storage and discharge processes. Furthermore, carbon nanomaterials exhibit excellent electrical conductivity, which is crucial for improving charge transfer efficiency and overall device performance.

Carbon nanomaterials are chemically stable and can be easily loaded with electrochemically active species to further enhance energy storage capabilities. The cost-effectiveness and environmentally friendly nature of carbon nanomaterials render them a preferred choice for various energy storage applications. Moreover, the integration of carbon nanomaterials into composite structures or their combination with other materials, such as metal films or graphene, has been shown to significantly improve the energy density and rate performance of supercapacitors.

Among carbon-based materials, graphitic carbon nitride (g-$C_3N_4$) presents several advantages over traditional activated carbon for supercapacitor applications. In particular, g-$C_3N_4$ is an active photocatalyst under visible light, in contrast to activated carbon, which lacks photocatalytic activity. The aforementioned property permits g-$C_3N_4$ to harness solar energy for charge storage, offering a renewable and sustainable energy solution. Additionally, g-$C_3N_4$ has a narrower bandgap compared to activated carbon, allowing g-$C_3N_4$ to absorb a broader spectrum of light wavelengths, which may enhance energy conversion efficiency and contribute to improved supercapacitor performance. Furthermore, g-$C_3N_4$ may be readily modified and tailored through techniques such as carbon-defect engineering and two-dimensional structural engineering. The modifications may enhance the structural properties of g-$C_3N_4$, such as increasing surface area and porosity, which are critical factors for effective charge storage in supercapacitors. As a result, g-$C_3N_4$ exhibits superior photoactivity, broader light absorption capabilities, and improved structural properties compared to activated carbon, making it a highly promising material for next-generation supercapacitor applications.

Research has been conducted in this regard, e.g., in *Surfaces* 2024, 7(3), 493-507, and *Molecules* 2024, 29(9), 2082, each of which are incorporated by reference here, but challenges still remain. Present techniques of manufacturing g-$C_3N_4$ composites are not efficient and economically sophisticated. Hence, there arises a requirement for a better and more efficient method of manufacturing carbon nanomaterials.

Accordingly, one object of the present disclosure is to provide a method of manufacturing carbon nanomaterials, that may circumvent the drawbacks, such as, low yield, high cost, low efficiency, of the methods known in the art.

SUMMARY

In an exemplary embodiment, a method of manufacturing a nanocomposite may include combining a magnesium salt, an aluminum salt, and a manganese salt in stoichiometric proportions within 5 (or 4, 3.33, 2.5, 2, 1.5, 1, 0.75, 0.67, 0.5, 0.33, 0.25, 0.125, 0.1, 0.05, 0.01, etc.) mol. % in an aqueous solvent including menthol or dextrose, to obtain a first mixture. The method may further include heating the first mixture to remove at least 99.5 percent by weight (wt. %) of the aqueous solvent to obtain a first solid, grinding the first solid into a first powder, calcining the first powder at a temperature in a range of from 600° C. to 800° C. for a time in a range of 2 to 4 hours to obtain a second solid. The method may further include grinding the second solid and urea, in an amount sufficient to form the nanocomposite, into a second powder, heating the second powder at a temperature in a range of from 550° C. to 650° C. for a time in a range of 15 minutes to 1.5 hours to obtain the nanocomposite, including graphitic $C_3N_4$, $MnO_2$, and $MgAl_2O_4$ in a mass relationship to each other in a range of 5 to 15:2 to 7:75 to 95, while tolerable variations of any of these values may be 2.5, 2, 1.5, 1, 0.75, 0.5, 0.25, 0.1, 0.5, or 0.1.

The average pore distribution of the nanocomposite may be unimodal, and a (Brunauer-Emmett-Teller) BET specific surface area of the nanocomposite may be in a range of from 16.2 $m^2$/g to 20.2 $m^2$/g (18.7±3, 2.5, 2, 1.5, 1, 0.75, 0.5, 0.25, 0.2, or 0.1 $m^2$/g). The average pore diameter of the nanocomposite, according to (Barrett-Joyner-Halenda) BJH measurement method, may be in a range of 5 to 15 nanometers (nm) (8.34±1.5, 1, 0.75, 0.5, 0.25, 0.2, or 0.1 nm). The average pore volume of the nanocomposite, according to the BJH measurement method, may be in a range of from 0.025 $cm^3$/g to 0.075 $cm^3$/g (0.05±0.02, 0.01, 0.0075, 0.005, 0.0025, or 0.001 $cm^3$/g).

The nanocomposite may have a (220) spinel interplanar spacing in a range of from 0.258 to 0.338 nm (0.298±0.02, 0.01, 0.0075, 0.005, 0.0025, or 0.001 nm), (400) spinel interplanar spacing in a range of from 0.165 to 0.245 nm (0.205±0.02, 0.01, 0.0075, 0.005, 0.0025, or 0.001 nm), (002) $MnO_2$ interplanar spacing in a range of from 0.106 to 0.186 nm (0.146±0.02, 0.01, 0.0075, 0.005, 0.0025, or 0.001 nm), and/or (211) $Al_2O_3$ interplanar spacing in a range of from 0.093 to 0.173 nm (0.133±0.02, 0.01, 0.0075, 0.005, 0.0025, or 0.001 nm), according to selected area diffraction (SAED).

The mass relationship of the nanocomposite may be in a range of from 9 to 11:4 to 6:84 to 86, where the nanocomposite has a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to SAED. An X-ray diffraction (XRD) spectrum of the nanocomposite under Cu-filtered Cu-Kα radiation (1.5418 Å) powered at 45 kV and 10 mA has 2θ peaks of an $MnO_2$ pyrolusite phase at 28.4±1°, 40.5±1°, 44.9±1°, 56.0±1°, 66.4±1°, and/or 79.1±1°, an MgAl$_2$O$_4$ spinel phase at 19.1±1°, 31.3±1°, 44.8±1°, 56.1±1°, 59.5±1°, 74.09±1°, and/or 78.1±1°, an MgO cubic phase at 42.8±1°, 62.2±1°, and/or 74.6±1°, an Al$_2$O$_3$ phase at 31.3±1°, 34.3±1°, and/or 61.6±1°, and/or g-C$_3$N$_4$-related diffractions at 18.8±1°, 28.2±1°, 35.5±1°, 40.7±1°, 44.6±1°, and/or 73.7±1°, and no more than 5, 4, 3, 2.5, 2, 1.5, 1, 0.75, 0.5, 0.25, 0.2, or 0.1% relative intensity of any other phase may be detected in the XRD spectrum.

The magnesium salt may include Mg(NO$_3$)$_2$, the aluminum salt in the combining may include Al(NO$_3$)$_3$, and the manganese salt in the combining may include manganese chloride. The method of heating of the first mixture results in the first solid with at least, 90, 91, 92, 92.5, 93, 94, 95, 96, 97, 97.5, 98, 99, 99.1, 99.5, or 99.9 wt. % of the aqueous solvent removed. The method of calcining the first powder may be at a temperature in a range of from 675° C. to 725° C. for a time in a range of from 2.75 to 3.25 hours, and the method of heating of the second powder may be at a temperature in a range of from 590° C. to 610° C. for a time in a range of from 55 minutes to 1.1 hours.

The nanocomposite may include no more than 10, 7.5, 5, 4, 3, 2, 1, 0.5, 0.1, 0.01, 0.001, 0.0001, or 0.00001 wt. % of TiO$_2$, relative to a total metal oxide weight.

The nanocomposite may include no more than 1, 0.75, 0.5, 0.25, 0.1, 0.01, 0.001, 0.0001, or 0.00001 wt. %, individually or in any combination, of AlN, ZnO, and SiO$_2$, relative to a total metal oxide weight.

The nanocomposite may include no more than 1, 0.75, 0.5, 0.25, 0.1, 0.01, 0.001, 0.0001, or 0.00001 parts of Ce, relative to a total Mn.

In some embodiments, carbon materials in the nanocomposite include no more than 1 wt. %, individually, carbon nanotubes or carbon dots, relative to total nanocomposite weight.

The nanocomposite no more than 1, 0.75, 0.5, 0.25, 0.1, 0.01, 0.001, 0.0001, or 0.00001 wt. % AgBr, relative to a total metal oxide weight, and the nanocomposite no more than 1, 0.75, 0.5, 0.25, 0.1, 0.01, 0.001, 0.0001, or 0.00001 wt. % tungsten oxide, relative to a total nanocomposite weight.

The nanocomposite may include no more than 1, 0.75, 0.5, 0.25, 0.1, 0.01, 0.001, 0.0001, or 0.00001 wt. % Co, relative to total nanocomposite weight.

The nanocomposite may include no more than 1, 0.75, 0.5, 0.25, 0.1, 0.01, 0.001, 0.0001, or 0.00001 wt. %, individually or in combination, CuO and/or WO$_3$, relative to total nanocomposite weight.

The nanocomposite may include no more than 1, 0.75, 0.5, 0.25, 0.1, 0.01, 0.001, 0.0001, or 0.00001 wt. %, individually or in combination, of elemental state Co and/or Fe, relative to total nanocomposite weight.

The method may avoid or otherwise not include sonicating any starting materials, particularly in a range of from 1 kilohertz (kHz) to 100 kHz.

The nanocomposite may include no more than 10, 7.5, 5, 4, 3, 2, 1, 0.5, 0.1, 0.01, 0.001, 0.0001, or 0.00001 wt. % MgO, relative to a total metal oxide weight.

The nanocomposite obtained may include no more than 1, 0.75, 0.5, 0.25, 0.1, 0.01, 0.001, 0.0001, or 0.00001 wt. % carbonaceous material besides the graphitic carbon nitride, and carbon materials in the nanocomposite include no nanotubes, relative to total nanocomposite weight.

The nanocomposite may include no more than 10, 7.5, 5, 4, 3, 2, 1, 0.5, 0.1, 0.01, 0.001, 0.0001, or 0.00001 wt. % VO$_4$, relative to total vanadium-oxide weight. The nanocomposite may include no more than 1, 0.75, 0.5, 0.25, 0.1, 0.01, 0.001, 0.0001, or 0.00001 wt. % V-doped ZnO, relative to total nanocomposite weight.

In some embodiments, relative to a total metal oxide weight, the nanocomposite may include no more than 1, 0.75, 0.5, 0.25, 0.1, 0.01, 0.001, 0.0001, or 0.00001 wt. %, individually or in any combination, of Al$_2$O$_3$, ZnO, Fe$_3$O$_4$, CeFeO$_3$, GdFeO$_3$, LaFeO$_3$, BaTiO$_3$, CaTiO$_3$, SrTiO$_3$, CaZrO$_3$, PbTiO$_3$, Mg$_{1-x}$Ni$_x$Fe$_2$O$_4$ (x=0.0, 0.6, 1.0), Ag, CoFe$_2$O$_4$, CuFe$_2$O$_4$, MnFe$_2$O$_4$, NiFe$_2$O$_4$, ZnFe$_2$O$_4$, Cu$_{1-x}$Cd$_x$Fe$_2$O$_4$, Zn$_{0.7}$Ni$_{0.15}$Cu$_{0.15}$Fe$_2$O$_4$, Zn$_{0.3}$Ni$_{0.7-x}$Co$_x$Fe$_2$O$_4$ (0≤x≤0.7), Mn$_{0.1}$Mg$_{0.2}$(Co, Ni, Zn)$_{0.7}$Fe$_2$O$_4$, LaCo$_{0.5}$Fe$_{0.5}$O$_3$, Mg$_{0.1}$—Co$_{0.9}$Fe$_2$O$_4$, La$_{1-x}$Gd$_x$Cr$_{1-y}$Ni$_y$O$_3$, Gd$_2$FeCrO$_6$, KTaO$_3$, NaTaO$_3$, NaNbO$_3$, KNbO$_3$, Mg$_{1-x}$Ni$_x$Fe$_2$O$_4$, Cu$_{0.5}$Cd$_{0.25}$Co$_{0.25}$Fe$_{2-x}$O$_4$, Zn$_{0.5}$Co$_{0.5}$La$_x$Fe$_{2-x}$O$_4$, Pr$_2$Ti$_2$O$_7$, SiO$_2$, TiO$_2$, ZnO, ZnS, Bi$_4$O$_5$I$_2$, SrFe$_{0.5}$Ta$_{0.5}$O$_3$, La$_{0.5}$Ba$_{0.2}$TiO$_{3.5-δ}$, LaTiO$_{3.5-δ}$, NaNbO$_3$, and LaFeO$_3$.

The graphitic C$_3$N$_4$ in the nanocomposite may consist essentially of sheet morphologies, i.e., such that the BET surface area of the nanocomposite is within 2.5% of that with pure sheet morphologies. The graphitic C$_3$N$_4$ in the nanocomposite may include no more than inevitable traces of boron, e.g., no more than 5, 4, 3, 2.5, 2, 1, 0.5, 0.1, 0.01, 0.001, 0.0001, or 0.00001 wt. %, relative to total nanocomposite weight, of boron.

In another exemplary embodiment, the nanocomposite may include no more than 10, 7.5, 5, 4, 3, 2, 1, 0.5, 0.1, 0.01, 0.001, 0.0001, or 0.00001 wt. %, individually or in total, relative to total metal content, of any of Zn, Ce, Gd, La, Ba, Ti, Ca, Sr, Zr, Pb, Ni, Ag, Co, Cu, Mn, Cd, W, Ta, Nb, Pr, and Bi, and the nanocomposite may include no more than 1, 0.75, 0.5, 0.25, 0.1, 0.01, 0.001, 0.0001, or 0.00001 wt. %, individually or in any combination, relative to total carrier weight, of SiO$_2$, TiO$_2$, ZnO, and/or ZnS.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values there between.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram (cm$^3$/g) and is an important parameter in characterizing the porous structure of materials, such as adsorbents or catalysts.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'unimodal' refers to a distribution or pattern that has a single peak or mode. In the context of particle size or material properties, it indicates that the sample may include of particles or components that are primarily of one size or characteristic, rather than varying widely in size or composition.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure is directed to a method of manufacturing a nanocomposite of graphitic carbon nitride (g-$C_3N_4$), manganese oxide ($MnO_2$), and magnesium aluminate ($MgAl_2O_4$) ($C_3N_4$@$MnO_2$/$MgAl_2O_4$). Each component of the nanocomposite, when used in appropriate ratios, is effective in the photodegradation of organic contaminants in water with high efficiency and photodegradation activity.

A nanocomposite of g-$C_3N_4$@$MnO_2$/$MgAl_2O_4$ including g-$C_3N_4$, $MnO_2$, and $MgAl_2O_4$ is described. The nanocomposite may include coating of g-$C_3N_4$ on $MnO_2$ and $MgAl_2O_4$. The g-$C_3N_4$, $MnO_2$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The g-$C_3N_4$, $MnO_2$, and $MgAl_2O_4$ are present in the nanocomposite in a mass relationship to each other of 10:5:85 wt. %, while tolerable variations of any of these values may be ±2.5, 2, 1.5, 1, 0.75, 0.5, 0.25, 0.1, 0.5, or 0.1. When each component of the nanocomposite is used in desired weight ratios, the nanocomposite exhibits excellent performance in photodegradation of organic pollutants owing to its enhanced catalytic properties, high surface reactivity, and efficient adsorption, making it suitable for applications in environmental remediation, energy production, and biomedical treatments.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite may be in a range of from 16.2 to 20.2 $m^2/g$ square meters per gram ($m^2/g$), including subranges of 16.5 to 20.0 $m^2/g$, 18.0 to 19.5 $m^2/g$ and 18.5 to 19.0 $m^2/g$. The surface area on the nanocomposite may be 18.7±3.33, 2.5, 2, 1.5, 1, 0.75, 0.67, 0.5, 0.33, 0.25, 0.125, 0.1, 0.05, or 0.01 $m^2/g$. The BET hypothesis may be the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad and gaussian. The average pore distribution of nanocomposite may be unimodal, indicating a single dominant pore size within the material.

The average pore diameter of the nanocomposite, according to Barrett-Joyner-Halenda (BJH) measurement method, may be in a range of from 5 to 15 nm, preferably 6 to 14 nm, preferably 6.5 to 12 nm, preferably 7 to 11 nm and preferably 8 to 10 nm. The nanocomposite has an average pore diameter of 8.34±1.5, 1, 0.75, 0.67, 0.5, 0.33, 0.25, 0.125, 0.1, 0.05, or 0.01 nm.

The average pore volume of the nanocomposite, according to the BJH measurement method, may be in a range of from 0.025 to 0.075 cubic centimeters per gram ($cm^3/g$), preferably 0.030 to 0.070 $cm^3/g$, preferably 0.035 to 0.065 $cm^3/g$ and preferably 0.048 to 0.060 $cm^3/g$. The average pore volume of the nanocomposite may be 0.05±0.01, 0.0075, 0.005, 0.0025, 0.001, 0.0001, or 0.00001 $cm^3/g$.

The mass relationship of the nanocomposite may be in a range of from 9 to 11:4 to 6:84 to 86 and preferably 9.5 to 10.5:4.5 to 5.5:84.5 to 85.5. The nanocomposite may include 10:5:85 wt. % of the respected components, while tolerable variations of any of these values may be ±2.5, 2, 1.5, 1, 0.75, 0.5, 0.25, 0.1, 0.5, or 0.1.

The nanocomposite may have a (220) spinel interplanar spacing in a range of from 0.258 to 0.338 nm, preferably 0.298±2% nm, preferably 0.268 to 0.328 nm, preferably 0.280 to 0.305 nm and preferably 0.285 to 0.310 nm, according to selected area diffraction.

The nanocomposite may have a (400) spinel interplanar spacing in a range from 0.165 to 0.245 nm, preferably 0.205±2% nm, preferably 0.170 to 0.240 nm, preferably 0.180 to 0.235 nm, preferably 0.195 to 0.225 nm and preferably 0.200 to 0.215 nm, according to selected area diffraction. The nanocomposite may have a (002) $MnO_2$ interplanar spacing in a range of from 0.106 to 0.186 nm preferably 0.146±2% nm, preferably 0.110 to 0.175 nm, preferably 0.125 to 0.160 nm, preferably 0.135 to 0.150 nm, preferably 0.140 to 0.149 nm and preferably 0.142 to 0.147 nm, according to selected area diffraction. The nanocomposite may have a (211) $Al_2O_3$ interplanar spacing in a range of from 0.093 to 0.173 nm preferably 0.133±2% nm, preferably 0.095 to 0.166 nm, preferably 0.100 to 0.158 nm, preferably 0.120 to 0.145 nm and preferably 0.125 to 0.140 nm, according to selected area diffraction.

The nanocomposite may have a (220) spinel interplanar spacing of 0.298 nm, (400) spinel interplanar spacing of 0.205 nm, a (002) $MnO_2$ interplanar spacing of 0.146 nm, a (211) $Al_2O_3$ interplanar spacing of 0.133 nm according to selected area diffraction.

The XRD spectrum of the nanocomposite may show that the nanocomposite is crystalline and exhibits a $MnO_2$ phase, a magnesium oxide (MgO) phase, a magnesium aluminum oxide ($MgAl_2O_4$) phase, an $Al_2O_3$ phase, and a graphite-phase carbon nitride ($g-C_3N_4$) phase.

The $MnO_2$ may also exist in other forms, such as α-, β-, γ-, ε-, δ-, OMS-6-, todorokite, λ-$MnO_2$, and or mixtures thereof, although predominantly and preferably the $MnO_2$ may exist in pyrolusite phase. The MgO may exist in various phases like hexagonal (or Wustite) phase, rhombohedral phase, tetragonal phase, orthorhombic phase and amorphous MgO. The MgO phase in the nanocomposite may be cubic. $Al_2O_3$ may exist in various crystalline phases like the cubic γ and η phases, the monoclinic θ phase, the hexagonal χ phase, the orthorhombic κ phase, and the δ phase that can be tetragonal or orthorhombic, or mixtures thereof. Graphitic carbon nitride ($g-C_3N_4$) exists in several crystalline phases, including α (alpha), β (beta), γ (gamma), and other less-common phases, or mixtures thereof.

$MgAl_2O_4$ has a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse." The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity.

The XRD spectrum of the nanocomposite under Cu-filtered Cu-Kα radiation (1.5418 Å) powered at 45 kilovolt (kV) and 10 milliampere (mA) may have 2θ peaks of an $MnO_2$ pyrolusite phase at 28.4±1, 40.5±1, 44.9±1, 56.0±1, 66.4±1, and/or 79.1±1°. The pyrolusite phase of $MnO_2$ (COD No. 2105790) may be closely matched with the diffraction lines seen at 28.4, 40.5, 44.9, 56.0, 66.4, and/or 79.1. The XRD spectrum of the nanocomposite under Cu-filtered CuKα radiation (1.5418 Å) powered at 45 kilovolt (kV) and 10 milliampere (mA) may have 2θ peaks of an $MgAl_2O_4$ spinel phase at 19.1±1, 31.3±1, 44.8±1, 56.1±1, 59.5±1, 74.09±1, and/or 78.1±1°. The $MgAl_2O_4$ spinel's diffractions are recorded at 2θ values of 44.8, 56.1, 59.5, 74.09, 78.1, 19.1, and/or 31.3°. The XRD spectrum of the nanocomposite under Cu-filtered Cu-Kα radiation (1.5418 Å) powered at 45 kilovolt (kV) and 10 milliampere (mA) has 2θ peaks of an MgO cubic phase at 42.8±1, 62.2±1, and/or 74.6±1°, The MgO (COD card, No. 9000499) showed a cubic phase at 2θ values of 42.8, 62.2, and/or 74.6°. The XRD spectrum of the nanocomposite under Cu-filtered Cu-Kα radiation (1.5418 Å) powered at 45 kilovolt (kV) and 10 milliampere (mA) may have 2θ peaks of an $Al_2O_3$ phase at 31.3±1, 34.3±1, and/or 61.6±1°. At 31.3, 34.3, and/or 61.6°, $Al_2O_3$ traces may be detected (COD No. 4002418). The XRD spectrum of the nanocomposite under Cu-filtered Cu-Kα radiation (1.5418 Å) powered at 45 kilovolt (kV) and 10 milliampere (mA) may have 2θ peaks of $g-C_3N_4$-related diffractions at 18.8±1, 28.2±1, 35.5±1, 40.7±1, 44.6±1, and/or 73.7±1°. The $g-C_3N_4$ diffractions may be detected at 18.8, 28.2, 35.5, 40.7, 44.6, and/or 73.7°.

No more than 5, 4, 3, 2, 1, 0.5, 0.1, 0.01, 0.001, 0.0001, or 0.00001% relative intensity of any other phase may be detected in the XRD spectrum. The minimal presence of any other phase in the nanocomposite may be useful to maintaining its enhanced catalytic properties, high surface reactivity, and efficient adsorption. This ensures desired performance in environmental remediation, energy production, and biomedical applications.

The morphology of graphitic $C_3N_4$ may be additionally or alternatively nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars. The $g-C_3N_4$ in the nanocomposite may include essentially sheet morphologies. The $g-C_3N_4$ may consist (essentially) of curled and wrinkled nanosheets and platelets, i.e., such that the BET surface area varies by no more than 5% from nanoparticles with only $g-C_3N_4$ that are curled and wrinkled nanosheets and platelets.

The graphitic $C_3N_4$ in the nanocomposite may include no more than inevitable traces of boron, e.g., no more than 2, 1, 0.5, 0.1, 0.01, 0.001, 0.0001, or 0.00001 wt. % of boron, relative to total graphitic $C_3N_4$ weight. Limiting boron to trace amounts ensures that the graphitic carbon nitride maintains its optimal performance in applications like photocatalysis, where the material's structural integrity and electron mobility are critical for efficiency.

The nanocomposite may include no more than 10, 7.5, 5, 4, 3, 2, 1, 0.5, 0.1, 0.01, 0.001, 0.0001, or 0.00001 wt. % of $TiO_2$, preferably less than 9 wt. % of $TiO_2$, preferably less than 8 wt. % of $TiO_2$, preferably less than 7 wt. % of $TiO_2$, preferably less than 6 wt. % of $TiO_2$, preferably less than 5 wt. % of $TiO_2$, preferably less than 4 wt. % of $TiO_2$, preferably less than 3 wt. % of $TiO_2$, preferably less than 2 wt. % of $TiO_2$, and preferably less than 1 wt. % of $TiO_2$, relative to a total metal oxide weight.

The nanocomposite may include no more than 1, 0.75, 0.5, 0.25, 0.1, 0.01, 0.001, 0.0001, or 0.00001 wt. %, individually or in any combination, of $TiO_2$, AlN, ZnO, and/or $SiO_2$, relative to a total metal oxide weight. The controlled inclusion of $TiO_2$, AlN, ZnO, and $SiO_2$ may help to avoid excessive phase separation, chemical incompatibility, or degradation over time. By limiting the concentration of these materials, the balance between the desired mechanical, thermal, or electrical properties can be achieved, leading to enhanced durability, reliability, and functionality in a range of applications.

The nanocomposite may include no more than 10, 7.5, 5, 4, 3, 2, 1, 0.5, 0.1, 0.01, 0.001, 0.0001, or 0.00001 wt. % MgO, preferably less than 9 wt. % of MgO, preferably less than 8 wt. % of MgO, preferably less than 7 wt. % of MgO, preferably less than 6 wt. % of MgO, preferably less than 5 wt. % of MgO, preferably less than 4 wt. % of MgO, preferably less than 3 wt. % of MgO, preferably less than 2 wt. % of MgO, and preferably less than 1 wt. % relative to a total metal oxide weight.

The nanocomposite may include no more than 10, 7.5, 5, 4, 3, 2, 1, 0.5, 0.1, 0.01, 0.001, 0.0001, or 0.00001 wt. % $VO_4$, preferably less than 9 wt. % of $VO_4$, preferably less than 8 wt. % of $VO_4$, preferably less than 7 wt. % of $VO_4$, preferably less than 6 wt. % of $VO_4$, preferably less than 5 wt. % of $VO_4$, preferably less than 4 wt. % of $VO_4$, preferably less than 3 wt. % of $VO_4$, preferably less than 2 wt. % of $VO_4$, and preferably less than 1 wt. % of $VO_4$ relative to total vanadium-oxide weight. The nanocomposite may include no more than 1 wt. % AgBr, relative to a total metal oxide weight.

In some embodiments, relative to a total metal oxide weight, the nanocomposite may include no more than 1, 0.75, 0.5, 0.25, 0.1, 0.01, 0.001, 0.0001, or 0.00001 wt. %, individually or in any combination, of $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.5}Ba_{0.2}TiO_{3.5-\delta}$, $LaTiO_{3.5-\delta}$, $NaNbO_3$, and/or $LaFeO_3$.

The nanocomposite may include no more than 1, 0.75, 0.5, 0.25, 0.1, 0.01, 0.001, 0.0001, or 0.00001 wt. % of carbonaceous material, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride. A low concentration of carbonaceous material can contribute to maintaining the desired structural integrity and functional properties of the nanocomposite. A minimal amount of additional carbon material may prevent any significant interference with the performance of the graphitic carbon nitride, particularly in applications such as photocatalysis or energy storage, where the purity and specific properties of the $g-C_3N_4$ are crucial.

The carbon materials in the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, individually or in combination, of carbon nanotubes and/or carbon dots, relative to total nanocomposite weight. The carbon materials in the nanocomposite may include no nanotubes relative to total nanocomposite weight, or no more than 5, 4, 3, 2.5, 2, 1, 0.5, 0.1, 0.01, 0.001, 0.0001, or 0.00001 wt. %, relative to total nanocomposite carbonaceous matter weight, of nanotubes.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. % individually or in any combination/in total, relative to total metal content, of any of Zn, Ce, Gd, La, Ba, Ti, Ca, Sr, Zr, Pb, Ni, Ag, Co, Cu, Mn, Cd, W, Ta, Nb, Pr, and/or Bi.

The nanocomposite may include no more than 1, 0.75, 0.5, 0.25, 0.1, 0.01, 0.001, 0.0001, or 0.00001 parts of Ce, relative to a total Mn.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably less than 0.1 wt. %, preferably less than 0.05 wt. %, and preferably less than 0.01 wt. % Co, relative to total nanocomposite weight. The nanocomposite may contain no added Co, such as only inevitable traces, or no more than 5, 4, 3, 2.5, 2, 1, 0.5, 0.1, 0.01, 0.001, 0.0001, or 0.00001 wt. %, Co, relative to.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably less than 0.1 wt. %, preferably less than 0.05 wt. %, and preferably less than 0.01 wt. % V-doped ZnO, relative to total nanocomposite weight.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably less than 0.1 wt. %, preferably less than 0.05 wt. %, and preferably less than 0.01 wt. % tungsten oxide, relative to a total nanocomposite weight.

In some embodiments, wherein the nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % individually, CuO and $WO_3$, relative to total nanocomposite weight.

The nanocomposite may include no more than 1, 0.75, 0.5, 0.25, 0.1, 0.01, 0.001, 0.0001, or 0.00001 wt. % of elemental state Co and/or Fe, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % individually or in combination, elemental state Co and/or Fe, relative to total nanocomposite weight.

Excessive metal accumulation could negatively impact the nanocomposite's stability, reactivity, or selectivity. By limiting the metal content, the nanocomposite can maintain a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % individually or together in any combination/in total, relative to total carrier weight, of $SiO_2$, $TiO_2$, ZnO, and/or ZnS. Excessive amounts of these components could lead to phase separation, degradation, or the formation of unwanted side reactions, which may negatively impact the performance, stability, or longevity of the nanocomposite. The limited concentration of these materials ensures their functionality may be maximized without compromising the overall mechanical, chemical, or electrical characteristics required for the intended application.

Figure 1:
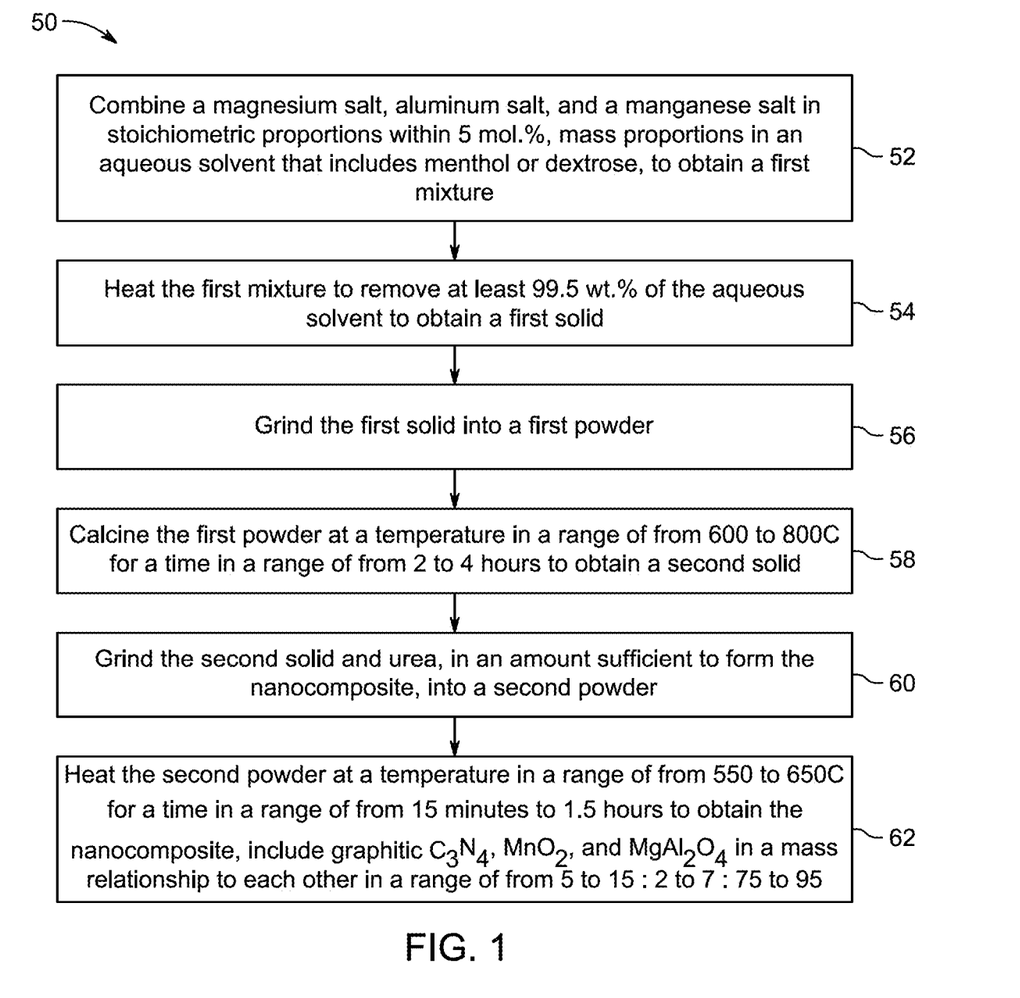
FIG. 1 is an exemplary flow chart of a method of manufacturing an inventive nanocomposite.

FIG. 1 illustrates a schematic flow chart of a method 50 of manufacturing the g-$C_3N_4$@$MnO_2$/$MgAl_2O_4$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 may include combining a magnesium salt, aluminum salt, and a manganese salt in stoichiometric proportions within 5 mole percent (mol. %), mass proportions in an aqueous solvent comprising menthol or dextrose, to obtain a first mixture. The magnesium salt may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. The magnesium salt is magnesium nitrate ($Mg(NO_3)_2$).

The aluminum salts may include, but are not limited to, aluminum nitrate, aluminum chloride, aluminum sulfate, and aluminum acetate. The aluminum salts may include, but are not limited to, aluminum bromide, aluminum nitrate, aluminum fluoride, aluminum iodide, aluminum thiocyanate, aluminum formate, and aluminum lactate. The aluminum salt may be aluminum nitrate ($Al(NO_3)_3$).

The manganese salts may include, but are not limited to, manganese acetate, manganese carbonate, manganese tetroxide, manganese dioxide, potassium permanganate, manganese gluconate, manganese oxide. The manganese salt may be manganese chloride ($MnCl_2$).

In some embodiments, other carbon sources apart from dextrose or menthol, such as sucrose, fructose, glucose, maltose, dextrose, corn syrup, lactose, glycerol, mannitol, sorbitol, menthol, and cellulose, or combinations thereof, may also or alternatively be used. The method of combining the magnesium salt, aluminum salt, and the manganese salt in stoichiometric proportions does not include sonicating any starting materials, for example, in a range of from 1 to 100 kHz.

At step 54, the method 50 may include heating the first mixture to remove at least 99.5 wt. % of the aqueous solvent to obtain a first solid. The heating of the first mixture generally removes the aqueous solvent such that the first solid is a solid that can be ground to a powder without further solvent removal. An aqueous solvent is a solvent in which water serves as the primary medium for dissolving other substances. Water is considered a polar solvent, which enables it to dissolve a wide variety of ionic and polar compounds. Water may be tap water, distilled water, double-distilled water, deionized water, deionized distilled water, reverse osmosis water, and/or some other water. Examples of aqueous solvents include water itself, as well as solutions like sodium chloride solution, acetic acid solution, ethanol solution, hydrochloric acid solution, sodium hydroxide solution, ammonia solution, hydrogen peroxide solution, and sodium bicarbonate solution. Other examples include potassium permanganate solution, citric acid solution, potassium chloride solution, glycerol solution, urea solution, calcium chloride solution, magnesium sulfate solution, sodium acetate solution, formic acid solution, and sodium nitrate solution. The aqueous solvent may be distilled water.

The heating can be performed by using heating appliances such as ovens, microwaves, autoclaves, hot plates, heating mantles and tapes, oil baths, salt baths, sand baths, air baths, hot-tube furnaces, and hot-air guns. In some embodiments, heating the first mixture to remove at least 99.5 wt. % of the aqueous solvent to obtain a first solid. In some embodiments, heating of the first mixture obtains the first solid with at least 99.9 wt. % of the aqueous solvent removed.

At step 56, the method 50 may include grinding the first solid into a first powder. The grinding may be carried out using any suitable means, for example, ball milling, blending. using manual method 50 (e.g., mortar) or machine-assisted method 50 such as using a mechanical blender, or any other apparatus known to those of ordinary skill in the art. Grinding provides efficient and consistent particle size reduction. The first solid may be ground using a mortar pestle into a powder.

At step 58, the method 50 may include calcining the first powder at a temperature in a range of from 600 to 800° C. for a time in a range of from 2 to 4 hours (h) to obtain a second solid. The calcination of the precipitate may be carried out by heating it to a high temperature, under a restricted supply of ambient oxygen. This may be performed to remove impurities or volatile substances and to incur thermal decomposition. Typically, the calcination may be carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

The powder may be calcined at a range of from 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., and preferably 690 to 710° C. for a time in a range of from 2 to 4 h, 2.5 to 3.5 h, and preferably 2.75 to 3.25 h, to obtain a second solid. The powder may be calcined at a range of from 675 to 725° C., preferably 680 to 720° C., preferably 685 to 715° C., preferably 690 to 710° C., preferably 695 to 705° C. for a time in a range of from 2.75 to 3.25 h, preferably 2.8 to 3.2 h, and preferably 2.9 to 3.1 h. The powder may be calcined at 700° C. for 3 h.

At step 60, the method 50 may include the grinding the second solid and urea, in an amount sufficient to form the nanocomposite, into a second powder. In alternate embodiments, nitrogen-containing precursors that may include, but not limited to, melamine, dicyandiamide, ammonium thiocyanate, or ammonium carbonate, may also be used. These alternatives provide the nitrogen necessary for the formation of carbon nitride structures.

At step 62, the method 50 may include heating the second powder at a temperature in a range of from 550 to 650° C. for a time in a range of from 15 minutes to 1.5 hours to obtain the nanocomposite including graphitic $C_3N_4$, $MnO_2$, and $MgAl_2O_4$ in a mass relationship to each other in a range of from 5 to 15:2 to 7:75 to 95.

The heating temperature ranges from 550 to 650° C., preferably 560 to 640° C., preferably 570 to 630° C., preferably 580 to 620° C., preferably 590 to 610° C., and yet more preferably 600° C. for a time in a range of from 15 min (0.25 h) to 1.5 h, preferably 0.3 h to 1.4 h, preferably 0.4 h to 1.3 h, preferably 0.5 h to 1.2 h, preferably 0.6 h to 1.1 h, preferably 0.7 h to 1.0 h, and preferably 0.8 h to 0.9 h to obtain the nanocomposite, including graphitic $C_3N_4$, $MnO_2$, and $MgAl_2O_4$ in a mass relationship to each other in a range of from 5 to 15:2 to 7:75 to 95, preferably 7 to 13:3 to 6:80 to 90, and preferably 9 to 11:4 to 5:84 to 86. The second powder may be heated at a temperature in a range of from 590-610° C., preferably 592 to 608° C., preferably 594 to 606° C., preferably 596 to 604° C., and preferably 598 to 602° C. for a time in a range of from 55 min to 1.1 h, and preferably 1 h.

The method may include heating the second powder at 600° C. for 1 h to obtain the nanocomposite, including graphitic $C_3N_4$, $MnO_2$, and $MgAl_2O_4$ in a mass relationship of 10:5:85. The second powder may be heated by using heating appliances such as hot plates, furnace, heating mantles ovens, microwaves, autoclaves, tapes, oil baths, salt baths, sand baths, air baths, hot-tube furnaces, and hot-air guns. The second powder may be heated in a furnace in a crucible.

EXAMPLES

The following examples demonstrate a method of manufacturing a nanocomposite. The examples are provided solely for illustration and are not to be construed as limitations of the present disclosure, as many variations thereof are possible without departing from the spirit and scope of the present disclosure.

Example 1: Fabrication of g-$C_3N_4$@$MnO_2$/ $MgAl_2O_4$ (10:5:85, wt. %) Nanocomposite According to the present disclosure, magnesium nitrate, and aluminum nitrate were added together in one beaker with manganese chloride, in predetermined amount (here, stoichiometric), to produce a 10% $MnO_2$/$MgAl_2O_4$. Further, about 10 g of menthol as fuel was added to the beaker, followed by 30 mL of distilled water. The beaker was heated till a clear solution was obtained, heated further till dryness. The product was ground in a mortar, transferred to a 150 mL porcelain dish, and calcined at 700° C. for 3.0 hours. Furthermore, the 10% $MnO_2$/$MgAl_2O_4$ product was cooled down to room temperature and weighed, ground with urea in an amount suitable (here, 2 g urea to 20 g of the 10% $MnO_2$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $MnO_2$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$MnO_2$/ $MgAl_2O_4$ (10:5:85, wt. %) nanohybrid/nanocomposite. The quadruple mixture was returned, and heated to 600° C. for 1.0 h in a covered porcelain crucible, and subsequently, the g-$C_3N_4$@$MnO_2$/$MgAl_2O_4$ (10:5:85, wt. %) nanohybrid was collected.

Example 2: Characterization

According to the present disclosure, X-ray diffraction (XRD) was used to identify the crystalline states in each specimen studied, employing the JDX-8030 X-ray (JEOL), made in Japan. Cu-filtered Cu-K$\alpha$ radiation (1.5418 Å) powered at 45 kV and 10 mA was used to run the patterns. The specimens were tested at ambient temperatures in a range of 2$\theta$=5° to 80°. The surface morphologies of the obtained samples were analyzed by transmission electron microscopy (TEM), selected area electron diffraction (SAED), and high-resolution transmission electron microscopy (HRTEM) images, obtained using a Tecnai-G20 (USA) transmission electron microscope with a 200 kV speed voltage. Nitrogen ($N_2$) adsorption isotherm obtained at 77 K using Micrometrics ASAP 2020 Brunauer-Emmett-Teller (BET) analyzer was used to calculate the surface characteristics, specifically the BET surface area, total pore volume (Vp), and mean pore radius (r). Before beginning the measurement, the samples were outgassed for three hours at 200° C. with a decreased pressure of $10^{-5}$ Torr.

Results and Discussion

Figure 2:
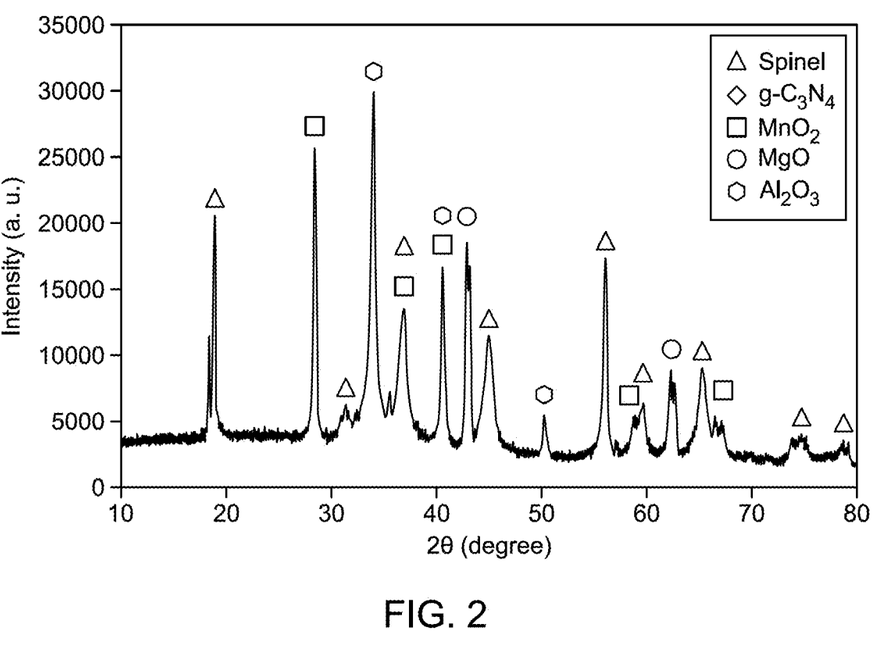
FIG. 2 is a graph depicting X-ray diffraction (XRD) patterns of an inventive g-C$_3$N$_4$@MnO$_2$/MgAl$_2$O$_4$ nanocomposite.

As mentioned above, XRD was used to examine the crystallinity and phase identification of the g-$C_3N_4$@$MnO_2$/ $MgAl_2O_4$ catalyst, the results are depicted in FIG. 2. As can be seen from FIG. 2, high crystalline nature of the powders is indicated by the strong peaks. The diffraction patterns are compared to the standard COD cards to demonstrate the presence of $MnO_2$, MgO, $MgAl_2O_4$, $Al_2O_3$, and g-$C_3N_4$ phases. The diffractions of $MgAl_2O_4$ spinel were recorded at 2$\theta$ values of 44.8°, 56.1°, 59.5°, 74.09°, 78.1°, 19.1°, and 31.3°. The standard COD card number 9001364 states that the diffractions originated from the (111), (220), (400), (422), (511) (620), and (622) planes, respectively. MgO (COD card, No. 9000499) showed a cubic phase at 2$\theta$ values of 42.8°, 62.2°, and 74.6°. The (200), (220), and (311), respectively, are represented by these lines. It was previously reported that MgO was present together with the $MgAl_2O_4$ spinel phase. The Pyrolusite phase of $MnO_2$ (COD No. 2105790) is closely matched with the diffraction lines observed at 28.4°, 40.5°, 44.9°, 56.0°, 66.4°, and 79.1°. According to COD No. 1534042, the g-$C_3N_4$ diffractions were detected at 18.8°, 28.2°, 35.5°, 40.7°, 44.6°, and 73.7°. At 31.3°, 34.3°, and 61.6°, $Al_2O_3$ traces were detected (COD No. 4002418). There were no further phases found, suggesting that g-$C_3N_4$@$MnO_2$/$MgAl_2O_4$ was successfully fabricated.

Figure 3A:
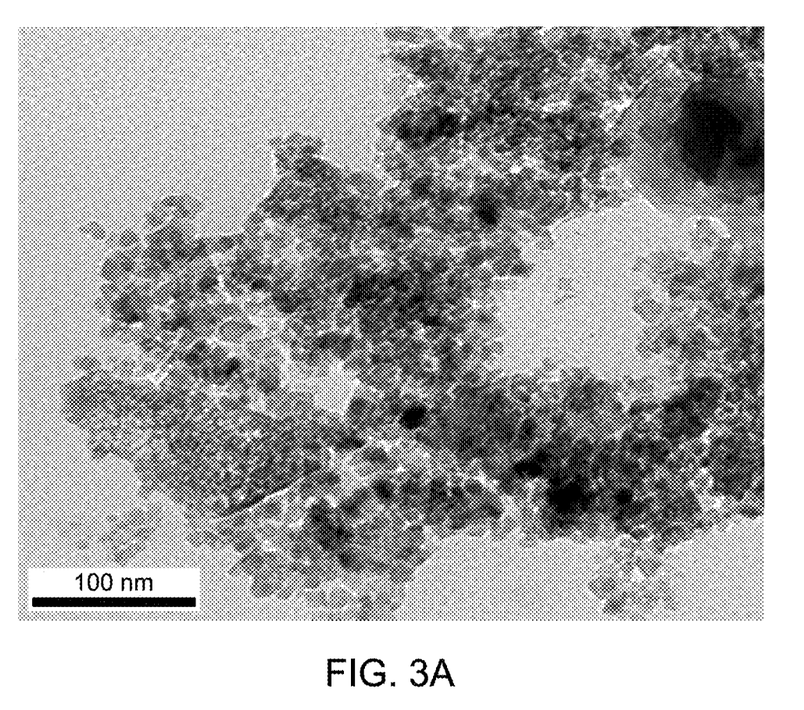
FIG. 3A is a transmission electron microscopy (TEM) image of an inventive g-C$_3$N$_4$@MnO$_2$/MgAl$_2$O$_4$ nanocomposite.
Figure 3B:
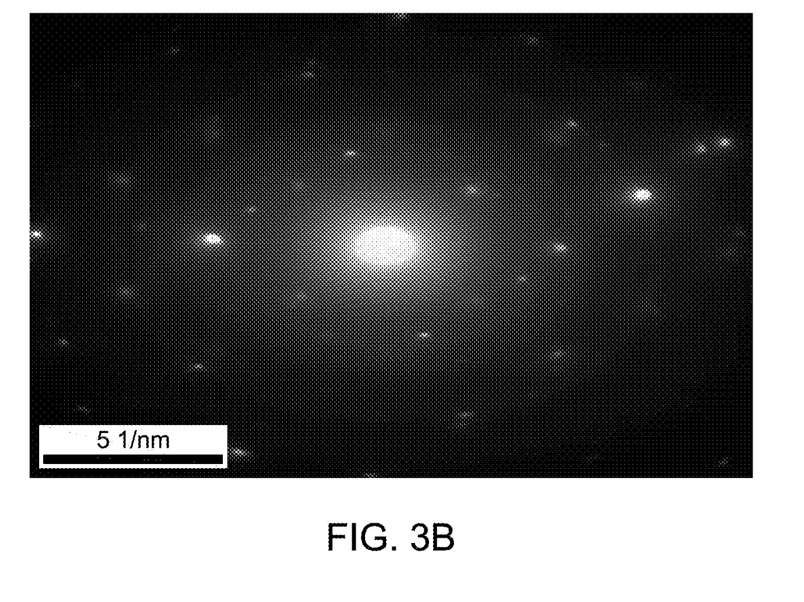
FIG. 3B depicts the selected area electron diffraction (SAED) analysis result for an inventive g-C$_3$N$_4$@MnO$_2$/MgAl$_2$O$_4$ nanocomposite.
Figure 3C:
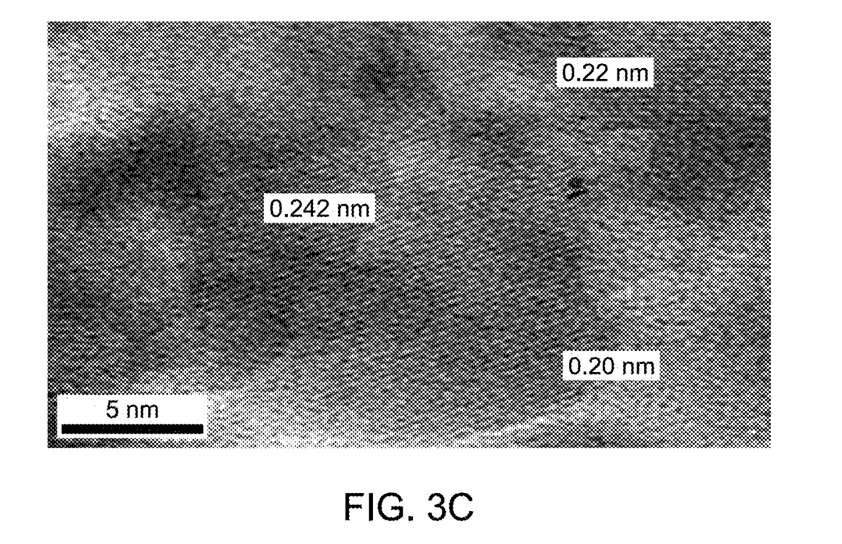
FIG. 3C is a high-resolution transmission electron microscopy (HRTEM) image of an inventive g-C$_3$N$_4$@MnO$_2$/MgAl$_2$O$_4$ nanocomposite.
Figure 3D:
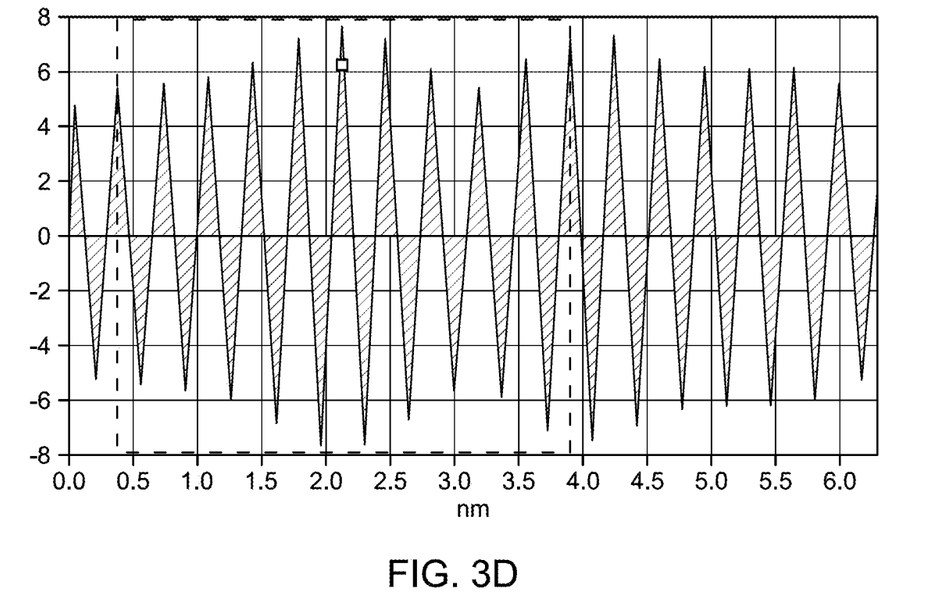
FIG. 3D is a fast Fourier transform (FFT) spectra of an inventive g-C$_3$N$_4$@MnO$_2$/MgAl$_2$O$_4$ nanocomposite.
Figure 3E:
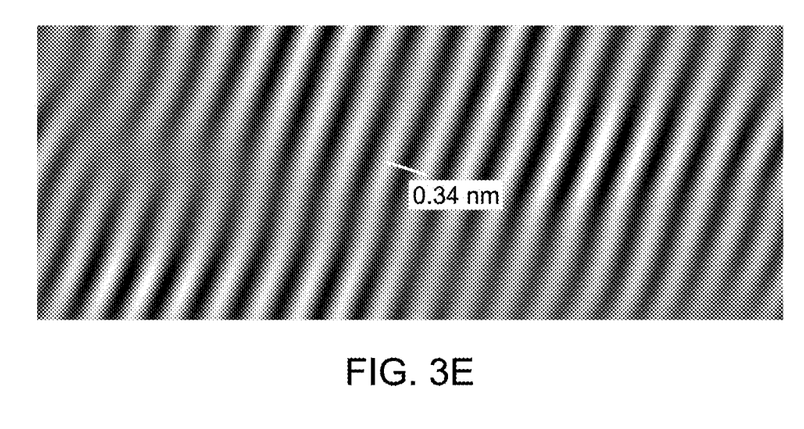
FIG. 3E is an inverse fast Fourier transform (IFFT) spectra of an inventive g-C$_3$N$_4$@MnO$_2$/MgAl$_2$O$_4$ nanocomposite.

Further, TEM images of g-$C_3N_4$@$MnO_2$/$MgAl_2O_4$ nanocomposite are shown in FIG. 3A. The TEM image shows the dispersion of homogeneous spherical metal oxides nanoparticles with size 7.9 nm on two-dimensional porous structure constructed with curled and wrinkled nanosheets and platelets of the g-$C_3N_4$. The corresponding SAED pattern of the nanocomposite, as shown in FIG. 3B, reveals diffraction spots with interplanar spacing of 0.298 nm, 0.205 nm, 0.146 nm, and 0.133 nm due to (220, spinel), (400, spinel), (002, $MnO_2$), and (211, $Al_2O_3$) diffraction planes, respectively. The corresponding HRTEM of the nanocomposite, as depicted in FIG. 3C, shows a plane spacing of 0.242 nm and 0.20 nm related to (311), and (400) planes of spinel, and 0.22 nm related to (200) plane of $MnO_2$, characterizing the heterostructure formation. The fast Fourier transform (FFT) and inverse fast Fourier transform (IFFT) measurements, as depicted in FIGS. 3D-3E, show a 'd' value of 0.34 nm given to g-$C_3N_4$@$MnO_2$/$MgAl_2O_4$ nanocomposite, signifying the lattice spacing of (002), indicating the development of spinel structure.

Figure 4A:
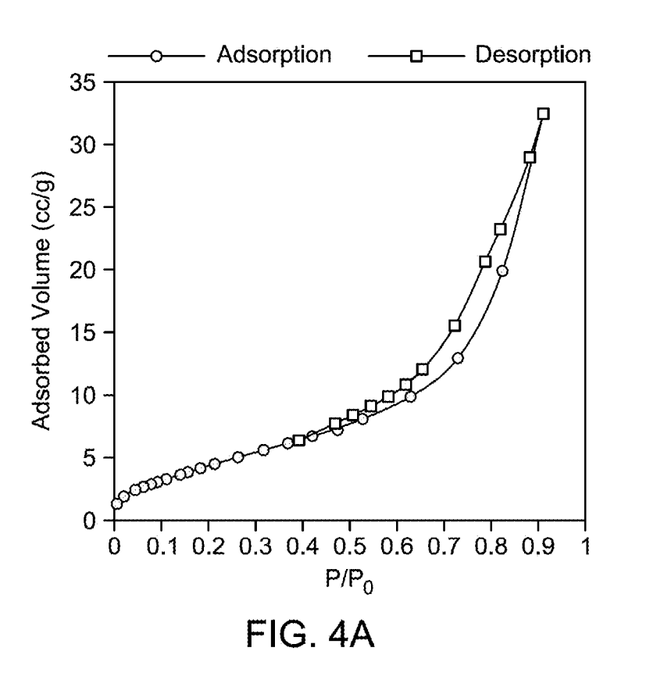
FIG. 4A is a graph depicting nitrogen adsorption-desorption isotherm of an inventive g-$C_3N_4$@$MnO_2$/$MgAl_2O_4$ nanocomposite.
Figure 4B:
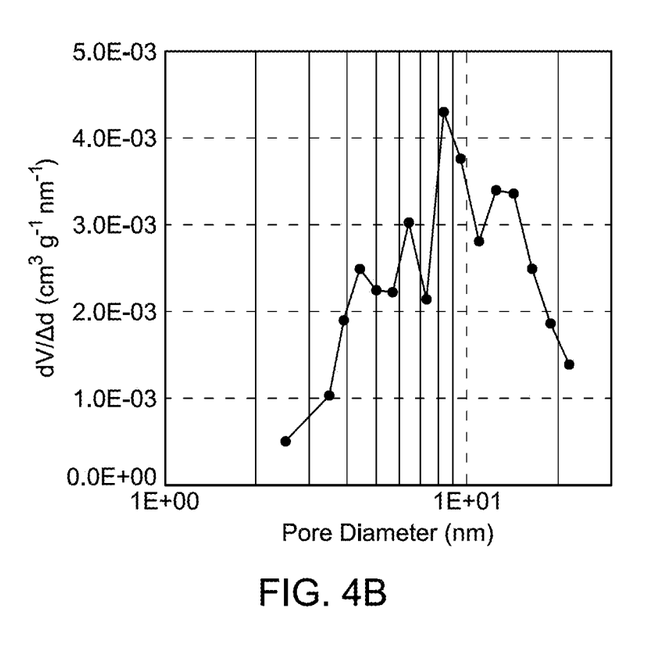
FIG. 4B is a graph depicting the pore size distribution of an inventive g-$C_3N_4$@$MnO_2$/$MgAl_2O_4$ nanocomposite.

According to the present disclosure, FIGS. 4A-4B shows the nitrogen adsorption-desorption isotherms of g-$C_3N_4$@$MnO_2$/$MgAl_2O_4$ nanocomposite. The nitrogen sorption isotherm of the composite relates to type IV with clear hysteresis loop, indicating the formation of mesoporous structures. However, shifting the loop to a relatively lower pressure (P/P°=0.39 to 1) suggests a decrease in the size of the mesopores, which may result from the deposition of metal oxides particles in the wide pores of g-$C_3N_4$. Furthermore, the BET surface area of the g-$C_3N_4$@$MnO_2$/ $MgAl_2O_4$ sample was calculated to be 18.7 $m^2$ $g^{-1}$. The marked high specific surface area reflects the good dispersion of the aforementioned metal oxides nanoparticles on g-$C_3N_4$. Moreover, the pore size distribution curves, plotted using the BJH method, for the g-$C_3N_4$@$MnO_2$/$MgAl_2O_4$ sample exhibited unimodal distribution with average pore diameters maximized at 8.34 nm and pore volume of 0.05 $cm^3$ $g^{-1}$. The isotherm belongs to the category H3 type of pores, which do not exhibit limiting adsorption at high P/P° and may arise due to aggregation of plate-like particles giving rise to slit-shaped pores. The aforementioned observation indicates that the assembly of g-$C_3N_4$@$MnO_2$/ $MgAl_2O_4$ composite provoked a mesoporous array.

Numerous modifications and variations of the present disclosure are possible in light of the above teachings. It is therefore to be understood that within the scope of the appended claims, the invention may be practiced otherwise than as specifically described herein.

The invention claimed is:

1. A method of manufacturing a g-$C_3N_4$@$MnO_2$/ $MgAl_2O_4$ nanocomposite, the method comprising:
   combining a magnesium salt, aluminum salt, and a manganese salt in stoichiometric proportions within 5 mol. %, in an aqueous solvent comprising menthol or dextrose, to obtain a first mixture;

heating the first mixture to remove at least 99.5 wt. % of the aqueous solvent to obtain a first solid;

grinding the first solid into a first powder;

calcining the first powder at a temperature in a range of from 600 to 800° C. for a time in a range of from 2 to 4 hours to obtain a second solid;

grinding the second solid and urea into a second powder;

heating the second powder at a temperature in a range of from 550 to 650° C. for a time in a range of from 15 minutes to 1.5 hours to obtain the g-$C_3N_4$@$MnO_2$/$MgAl_2O_4$ nanocomposite, comprising graphitic $C_3N_4$, $MnO_2$, and $MgAl_2O_4$ in a mass relationship to each other in a range of from 5 to 15:2 to 7:75 to 95.

2. The method of claim 1, wherein the average pore distribution of the g-$C_3N_4$@$MnO_2$/$MgAl_2O_4$ nanocomposite is unimodal, and wherein a BET specific surface area of the g-$C_3N_4$@$MnO_2$/$MgAl_2O_4$ nanocomposite is in a range of from 16.2 to 20.2 $m^2$/g, wherein an average pore diameter of the g-$C_3N_4$@$MnO_2$/$MgAl_2O_4$ nanocomposite, according to BJH measurement method, is in a range of from 5 to 15 nm, and/or wherein an average pore volume of the g-$C_3N_4$@$MnO_2$/$MgAl_2O_4$ nanocomposite, according to the BJH measurement method, is in a range of from 0.025 to 0.075 $cm^3$/g.

3. The method of claim 1, wherein the g-$C_3N_4$@$MnO_2$/$MgAl_2O_4$ nanocomposite has a (220) spinel interplanar spacing in a range of from 0.258 to 0.338 nm, (400) spinel interplanar spacing in a range of from 0.165 to 0.245 nm, (002) $MnO_2$ interplanar spacing in a range of from 0.106 to 0.186 nm, and (211) $Al_2O_3$ interplanar spacing in a range of from 0.093 to 0.173 nm, according to selected area diffraction.

4. The method of claim 1, wherein the g-$C_3N_4$:$MnO_2$:$MgAl_2O_4$ mass relationship of the g-$C_3N_4$@$MnO_2$/$MgAl_2O_4$ nanocomposite is in a range of from 9 to 11:4 to 6:84 to 86, wherein the g-$C_3N_4$@$MnO_2$/$MgAl_2O_4$ nanocomposite has a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to selected area diffraction, wherein an XRD spectrum of the g-$C_3N_4$@$MnO_2$/$MgAl_2O_4$ nanocomposite under Cu-filtered CuKα radiation (1.5418 Å) powered at 45 kV and 10 mA has 2θ peaks of an $MnO_2$ pyrolusite phase at 28.4±1, 40.5±1, 44.9±1, 56.0±1, 66.4±1, and 79.1±1°, an $MgAl_2O_4$ spinel phase at 19.1±1, 31.3±1, 44.8±1, 56.1±1, 59.5±1, 74.09±1, 78.1±1°, an MgO cubic phase at 42.8±1, 62.2±1, and 74.6±1°, an $Al_2O_3$ phase at 31.3±1, 34.3±1, and 61.6±1°, g-$C_3N_4$-related diffractions at 18.8±1, 28.2±1, 35.5±1, 40.7±1, 44.6±1, and 73.7±1°, and wherein no more than 5% relative intensity of any other phase is detected in the XRD spectrum.

5. The method of claim 1, wherein the magnesium salt in the combining comprises Mg($NO_3$)$_2$, wherein the aluminum salt in the combining comprises Al($NO_3$)$_3$, wherein the manganese salt in the combining comprises manganese chloride, wherein the heating of the first mixture obtains the first solid with at least 99.9 wt. % of the aqueous solvent removed, wherein the calcining is at a temperature in a range of from 675 to 725° C. for a time in a range of from 2.75 to 3.25 hours, and wherein the heating of the second powder is at a temperature in a range of from 590 to 610° C. for a time in a range of from 55 minutes to 1.1 hours.

6. The method of claim 1, wherein the g-$C_3N_4$@$MnO_2$/$MgAl_2O_4$ nanocomposite comprises no more than 10 wt. % of $TiO_2$, relative to a total metal oxide weight.

7. The method of claim 1, wherein the g-$C_3N_4$@$MnO_2$/$MgAl_2O_4$ nanocomposite comprises no more than 1 wt. %, individually, of AlN, ZnO, and $SiO_2$, relative to a total metal oxide weight.

8. The method of claim 1, wherein the g-$C_3N_4$@$MnO_2$/$MgAl_2O_4$ nanocomposite comprises no more than 0.1 wt % of Ce, relative to a total weight of the g-$C_3N_4$@$MnO_2$/$MgAl_2O_4$ nanocomposite.

9. The method of claim 1, wherein carbon materials in the g-$C_3N_4$@$MnO_2$/$MgAl_2O_4$ nanocomposite comprise no more than 1 wt. %, individually, carbon nanotubes or carbon dots, relative to total g-$C_3N_4$@$MnO_2$/$MgAl_2O_4$ nanocomposite weight.

10. The method of claim 1, wherein the g-$C_3N_4$@$MnO_2$/$MgAl_2O_4$ nanocomposite no more than 1 wt. % AgBr, relative to a total metal oxide weight, and wherein the g-$C_3N_4$@$MnO_2$/$MgAl_2O_4$ nanocomposite comprising no more than 1 wt. % tungsten oxide, relative to a total g-$C_3N_4$@$MnO_2$/$MgAl_2O_4$ nanocomposite weight.

11. The method of claim 1, wherein the g-$C_3N_4$@$MnO_2$/$MgAl_2O_4$ nanocomposite comprises no more than 1 wt. % Co, relative to total g-$C_3N_4$@$MnO_2$/$MgAl_2O_4$ nanocomposite weight.

12. The method of claim 1, wherein the g-$C_3N_4$@$MnO_2$/$MgAl_2O_4$ nanocomposite comprises no more than 1 wt. %, individually, CuO and $WO_3$, relative to total g-$C_3N_4$@$MnO_2$/$MgAl_2O_4$ nanocomposite weight.

13. The method of claim 1, wherein the g-$C_3N_4$@$MnO_2$/$MgAl_2O_4$ nanocomposite comprises no more than 1 wt. %, individually, elemental state Co and Fe, relative to total g-$C_3N_4$@$MnO_2$/$MgAl_2O_4$ nanocomposite weight.

14. The method of claim 1, which does not comprise sonicating any starting materials in a range of from 1 to 100 kHz.

15. The method of claim 1, wherein the g-$C_3N_4$@$MnO_2$/$MgAl_2O_4$ nanocomposite comprises no more than 10 wt. % MgO, relative to a total metal oxide weight.

16. The method of claim 1, wherein the g-$C_3N_4$@$MnO_2$/$MgAl_2O_4$ nanocomposite obtained comprises no more than 1 wt. % carbonaceous material besides the graphitic carbon nitride, and wherein carbon materials in the g-$C_3N_4$@$MnO_2$/$MgAl_2O_4$ nanocomposite comprise no nanotubes, relative to total g-$C_3N_4$@$MnO_2$/$MgAl_2O_4$ nanocomposite weight.

17. The method of claim 1, wherein the g-$C_3N_4$@$MnO_2$/$MgAl_2O_4$ nanocomposite comprises no more than 10 wt. % $VO_4$, relative to total vanadium-oxide weight, and wherein the g-$C_3N_4$@$MnO_2$/$MgAl_2O_4$ nanocomposite comprises no more than 1 wt. % V-doped ZnO, relative to total g-$C_3N_4$@$MnO_2$/$MgAl_2O_4$ nanocomposite weight.

18. The method of claim 1, wherein, relative to a total metal oxide weight, the g-$C_3N_4$@$MnO_2$/$MgAl_2O_4$ nanocomposite comprises no more than 1 wt. %, individually, of $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Zn_{0.3}Ni_{0.7-x}Co_xFe_2O_4$ ($0 \leq x \leq 0.7$), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $Gd_2FeCrO_6$, $KTaO_3$, $NaTaO_3$, $NaNbO_3$, $KNbO_3$, $Pr_2Ti_2O_7$, $SiO_2$, $TiO_2$, ZnO, ZnS, $Bi_4O_5I_2$, $SrFe_{0.5}Ta_{0.5}O_3$, $NaNbO_3$, and $LaFeO_3$.

19. The method of claim 1, wherein the graphitic $C_3N_4$ in the g-$C_3N_4$@$MnO_2$/$MgAl_2O_4$ nanocomposite consists essentially of sheet morphologies, and/or
wherein the graphitic $C_3N_4$ in the g-$C_3N_4$@$MnO_2$/$MgAl_2O_4$ nanocomposite comprises no boron.

20. The method of claim 1, wherein the g-$C_3N_4$@$MnO_2$/$MgAl_2O_4$ nanocomposite comprises no more than 10 wt. %, individually, relative to total metal content, of any of Zn, Ce, Gd, La, Ba, Ti, Ca, Sr, Zr, Pb, Ni, Ag, Co, Cu, Mn, Cd, W, Ta, Nb, Pr, and Bi, and
wherein the g-$C_3N_4$@$MnO_2$/$MgAl_2O_4$ nanocomposite comprises no more than 1 wt. %, individually, relative to total carrier weight, of $SiO_2$, $TiO_2$, ZnO, and ZnS.

* * * * *